United States Patent [19]

Barter

[11] 4,345,729
[45] Aug. 24, 1982

[54] THRUST UNITS

[75] Inventor: Arthur J. Barter, Farnborough, England

[73] Assignee: The Secretary of State for Defence in Her Britannic Majesty's Government of the United Kingdom of Great Britain and Northern Ireland, London, England

[21] Appl. No.: 175,610

[22] Filed: Aug. 6, 1980

[30] Foreign Application Priority Data

Aug. 16, 1979 [GB] United Kingdom ................ 7928563

[51] Int. Cl.³ .......................... B64G 1/26; F02G 3/00
[52] U.S. Cl. .................................. 244/169; 60/39.12; 60/39.46 G
[58] Field of Search .............. 244/169, 172; 60/39.12, 60/39.46 G; 123/3, DIG. 12

[56] References Cited

U.S. PATENT DOCUMENTS 3,517,508  6/1970  Newman et al. ............... 60/39.12
3,532,297 10/1970  Maes ............................. 244/169
4,185,593  1/1980  McClure ........................ 123/3

Primary Examiner—Galen L. Barefoot
Attorney, Agent, or Firm—Pollock, Vande Sande and Priddy

[57] ABSTRACT

A thrust unit for a space vehicle has a container in which an electrolyte is electrolyzed to produce combustible gases (for example, water producing hydrogen and oxygen). At a predetermined pressure the gases are ignited and combustion products are exhausted from the container through a thrust nozzle. The pulsed nature of the thrust unit operation, and the duration of each pulse, are such that overheating of the unit is avoided.

9 Claims, 2 Drawing Figures

THRUST UNITS

The present invention relates to thrust units for space vehicles.

Once a main power unit has been used to put a space vehicle into its predetermined trajectory or planetary orbit slight adjustments of the vehicle's attitude, orbital inclination or velocity are usually required to maintain the trajectory or orbit or to enable the vehicle to carry out its task. Even if fuel is still available in the main power unit it is not a suitable unit for effecting such adjustments. Instead, a number of thrust units, which eject gas, are situated at suitable positions on the vehicle and are operated as and when required under the control of position-sensing equipment within the vehicle or under the control of signals from the ground.

Gas may be provided to each thrust unit from a central supply, or may be generated separately within each unit.

It is an important consideration in the design of a space vehicle that the volume contained therein be used to maximum advantage and that the weight of each item within the vehicle is kept to a minimum. Gas for the thrust units is therefore usually generated on demand from a liquid or solid source. For the same reason gas is ejected from a thrust unit at the maximum practicable temperature and velocity. This frequently raises problems in preventing local overheating of parts of the vehicle.

Many types of thrust unit system have been used or are under development. In one type of system a stoichiometric mixture of hydrogen and oxygen is ignited in the thrust unit and the combustion product ejected. The hydrogen and oxygen are usually provided by electrolysis of water. Electrolysis is usually carried out at a central source, hydrogen and oxygen being supplied to thrust units as and when required. With this type of system great care must be taken to ensure that "flash-back" cannot occur from a thrust unit down a supply tube containing a stoichiometric mixture of hydrogen and oxygen. Any such "flash-back" would almost certainly be catastrophic, and its prevention requires extra weight, expense and complication such as separate delivery pipes for the two gases, or complicated non-return valves.

According to the present invention a thrust unit for a space vehicle includes a container, an electrolyzer unit within the container and means for supplying electrolyte to the electrolyzer unit, means for sensing when the pressure within the container is at a predetermined pressure, ignition means for igniting products of electrolysis at the predetermined pressure, and means for allowing gas to escape from the container.

The electrolyte is preferably water (with a suitable solute) providing a mixture of hydrogen and oxygen.

The means for allowing gas to escape from the chamber can be in the form of a pressure release valve.

A moisture sensor within the container can be used to control supply of electrolyte to the electrolyzer unit.

A preferred form of container is cylindrical with a cylindrical type electrolyzer unit.

One embodiment of the invention will now be described, by way of example only, with reference to the accompanying diagrammatic drawings, of which:

Figure 1:
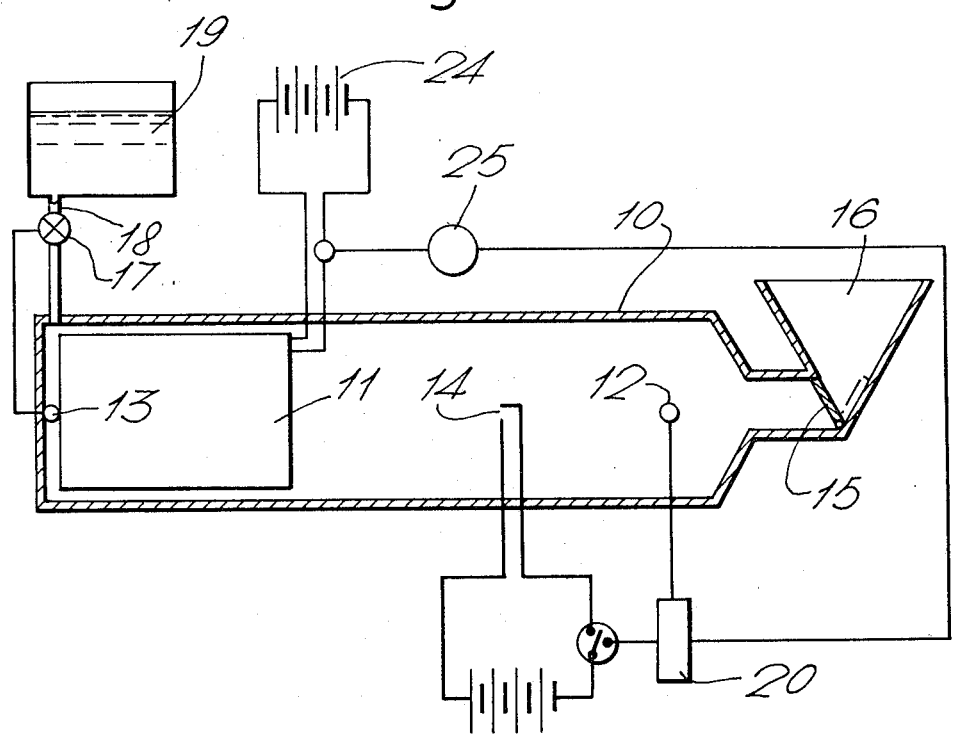
FIG. 1 is a side elevation, in section, of a thrust unit.

A thrust unit (FIG. 1) has a container 10 housing an electrolyzer unit 11, pressure sensing unit 12, moisture sensing unit 13 and ignition means 14. A pressure relief valve 15 is positioned between the container 10 and a thrust nozzle 16. The moisture sensing unit 13 controls a tap 17 in a supply line 18 from a water supply tank 19, and the pressure sensing unit 12 controls the ignition means 14 via an ignition control unit 20.

Figure 2:
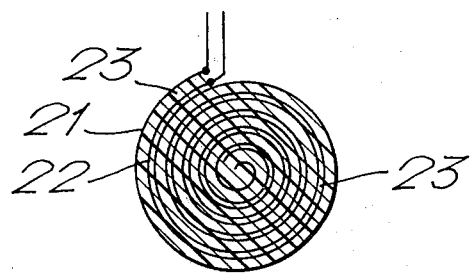
FIG. 2 is an end elevation of an electrolyzer.

The electrolyzer unit 11 (FIG. 2) has two parallel plate electrodes 21,22 coiled into a "swiss roll" arrangement, the space between the electrodes being filled with layers 23 of material which is water absorbent. The electrodes 21,22 are connected to an electrical supply 24 (FIG. 1). The electrical supply 24 and ignition control unit 20 are controlled by a vehicle orbit control unit 25.

In use, when the orbit control unit 25 senses that operation of the thrust unit is required to affect an orbital change of the vehicle (not shown) on which the unit is mounted it switches electrical supply 24 across the electrodes 21,22 and brings the ignition control unit 20 into operation. Water in the layers 23 of electrolyzer 10 is electrolyzed to give a stoichiometric supply of hydrogen and oxygen. The pressure in the container 10 builds up until, at a predetermined pressure sensed by the pressure sensing unit 12, the ignition control unit 20 activates the ignition means 14 to ignite the hydrogen and oxygen mixture. When the mixture ignites the rapid pressure rise causes the pressure relief valve 15 to open and allow combustion gases, in the form of water vapor, to pass through the thrust nozzle 16, imparting a reactive thrust on the thrust unit and hence on the vehicle. This process is repeated until the orbit control unit 25 senses that operation of the thrust unit is no longer required. The control unit 25 then switches off the electrical supply 24 to the electrolyzer 11 and the ignition orbit control unit 20.

While the combustion of hydrogen and oxygen is exothermic the time during which combustion takes place is extremely short and does not allow significant heating of the contents of container 10.

It will be realized that many alternative versions of the invention are possible. For example the ignition means 14 may be positioned in the thrust nozzle 16 with the pressure relief valve 15 acting as the pressure sensing device 14. This reduces the amount of combustion within the container 10. Also many alternative control arrangements are possible. For example the orbit control unit 25 may control the supply of water from tank 19 to electrolyzer 11, either in conjunction with or instead of (for example, by a metering system) the moisture sensing unit 13.

It will also be realized that many aspects of the embodiment of the invention described above have been illustrated and described in simplified form. For example the water supply system is illustrated as gravity feed, which is impossible in a space environment. However the problems of liquid movement, and their solution, are well known by those skilled in the art. As details of the means of water supply form no part of the present invention the simplest type of system has been described. A similar approach has been used for other details, well known to those skilled in the art, used in the invention.

When water is used as the electrolyte, as described herein, some solute will be dissolved therein. Such soluant (of which many are known) will remain in the absorbent layers 23 and need not be present in the water in supply tank 19. Whilst water has been described as the electrolyte, other electrolytes which are known in the art and which produce combustible gases, are alternatives.

What I claim is:

1. A thrust unit for a space vehicle whose attitude is monitored by a space vehicle attitude control system, said thrust unit comprising a container;

an electrolyzer unit within the container;

means for supplying electrolyte to the electrolyzer unit;

control means responsive to said space vehicle attitude control system for initiating operation of the electrolyzer unit to produce combustible gases from the electrolyte when a change in attitude of the space vehicle is desired;

means for sensing when the pressure within the container reaches a predetermined level;

ignition means for igniting the combustible gases within said container at the predetermined pressure level; and means for allowing combustion gases to escape from the container to effect a change in attitude of the space vehicle;

said control means being further responsive to said space vehicle attitude control system for terminating operation of said electrolyzer unit when the desired change in attitude of the space vehicle has been completed.

2. A thrust unit as claimed in claim 1 wherein the means for allowing gas to escape from the container comprises a pressure relief valve.

3. A thrust unit as claimed in claim 2 wherein the container is cylindrical.

4. A thrust unit as claimed in claim 3 wherein the electrolyzer unit is cylindrical.

5. A thrust unit as claimed in claim 2 wherein the pressure relief valve opens on to a thrust nozzle.

6. A thrust unit as claimed in claim 5 wherein the ignition means are triggered by operation of the pressure relief valve.

7. A thrust unit as claimed in claim 6 wherein the ignition means are sited in the thrust nozzle.

8. A thrust unit as claimed in claim 1 wherein the electrolyte is water.

9. A thrust unit as claimed in claim 8 wherein a moisture sensor within the container is used to control supply of water to the electrolyzer unit.

* * * * *